(12) United States Patent
Song et al.

(10) Patent No.: US 11,637,604 B2
(45) Date of Patent: Apr. 25, 2023

(54) METHOD OF TRANSMITTING CSI REPORT, TERMINAL DEVICE AND NETWORK DEVICE

(71) Applicant: VIVO MOBILE COMMUNICATION CO., LTD., Guangdong (CN)

(72) Inventors: Yang Song, Chang'an Dongguan (CN); Peng Sun, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 191 days.

(21) Appl. No.: 17/039,592

(22) Filed: Sep. 30, 2020

(65) Prior Publication Data
US 2021/0021315 A1    Jan. 21, 2021

Related U.S. Application Data

(63) Continuation of application No. PCT/CN2019/080994, filed on Apr. 2, 2019.

(30) Foreign Application Priority Data

Apr. 4, 2018 (CN) .......................... 201810302351.6

(51) Int. Cl.
*H04B 7/06* (2006.01)
*H04W 24/10* (2009.01)
(Continued)

(52) U.S. Cl.
CPC .......... *H04B 7/0626* (2013.01); *H04W 24/10* (2013.01); *H04W 72/0413* (2013.01); *H04W 72/10* (2013.01); *H04W 72/0453* (2013.01)

(58) Field of Classification Search
CPC ................ H04B 7/0626; H04W 24/10; H04W 72/0413; H04W 72/10; H04W 72/0453;
(Continued)

(56) References Cited

U.S. PATENT DOCUMENTS 10,530,528 B2 * 1/2020 Park ....................... H04L 1/0026
10,708,938 B2 * 7/2020 Papasakellariou .. H04W 72/042
(Continued)

FOREIGN PATENT DOCUMENTS

CN    102065560 A    5/2011
CN    102938680 A    2/2013
(Continued)

OTHER PUBLICATIONS

European Search Report dated Apr. 1, 2021, as received in application No. 19780930.
(Continued)

*Primary Examiner* — Brian T O Connor
(74) *Attorney, Agent, or Firm* — Maschoff Brennan

(57) ABSTRACT

A method of transmitting a CSI report, a terminal device and a network device are provided. The method includes: determining a target PUCCH resource; in a case that a payload of a CSI report set to be put into the target PUCCH resource is larger than a transmission capacity of the target PUCCH resource meeting a target code rate, placing a part of the CSI reports of the CSI report set into the target PUCCH resource, according to priorities of the CSI reports; in a case that the payload of the CSI report set is smaller than or equal to the transmission capacity of the target PUCCH resource meeting the target code rate, placing all the CSI reports of the CSI report set into the target PUCCH resource; and sending the placed CSI reports on the target PUCCH resource.

16 Claims, 6 Drawing Sheets

--- determining, based on one or more collision groups that need to be transmitted on a PUCCH resource of a component carrier, a target PUCCH resource — S510 in a case that each of priorities of the CSI reports in the one or more collision groups is lower than a priority of a target CSI report, discarding the CSI reports in the one or more collision groups — S520 sending the target CSI report on the PUCCH resource corresponding to the target CSI report in the component carrier — S530

(51) Int. Cl.
*H04W 72/04* (2009.01)
*H04W 72/10* (2009.01)
*H04W 72/0453* (2023.01)

(58) Field of Classification Search
CPC .......... H04W 74/0808; H04W 72/1284; H04L 5/0057; H04L 1/0026; H04L 1/0057; H04L 5/001
See application file for complete search history.

(56) References Cited

U.S. PATENT DOCUMENTS

| | | | |
|---|---|---|---|
| 11,147,065 B2* | 10/2021 | Wang | H04W 76/28 |
| 11,316,615 B2* | 4/2022 | Park | H04L 1/1861 |
| 11,363,482 B2* | 6/2022 | Gao | H04L 1/0026 |
| 2014/0140281 A1 | 5/2014 | Choudhury et al. | |
| 2014/0169204 A1 | 6/2014 | Cheng et al. | |
| 2015/0139101 A1 | 5/2015 | Guo et al. | |
| 2017/0041923 A1* | 2/2017 | Park | H04L 5/0053 |
| 2019/0059013 A1* | 2/2019 | Rahman | H04W 72/10 |
| 2019/0150172 A1* | 5/2019 | Ang | H04W 24/10 370/329 |
| 2019/0165896 A1* | 5/2019 | Huang | H04B 7/0626 |
| 2020/0067584 A1* | 2/2020 | Kang | H04W 72/0413 |
| 2021/0037526 A1* | 2/2021 | Takeda | H04W 72/1268 |

FOREIGN PATENT DOCUMENTS

| | | |
|---|---|---|
| CN | 103580818 A | 2/2014 |
| EP | 3755032 A1 | 12/2020 |
| WO | 2016119466 A1 | 8/2016 |

OTHER PUBLICATIONS

"Issues on CSI reporting" 3GPP TSG RAN WG1 Meeting AH 1801, R1-1800430, Vancouver, Canada, Jan. 22-26, 2018. Samsung.
"Prority rule fo CSI reporting" 3GPP TSG RAN WG1 Meeting AH 1801, R1-1800611, Vancouver, Canada, Jan. 22-26, 2018. Sharp.
"Remaining details for CSI reporting on PUCCH" 3GPP TSG RAN WG1 Meeting AH 1801, R1-1800744 Vancouver, Canada, Jan. 22-26, 2018. Nokia.
Chinese Office Action issued in corresponding application No. 201810302351.6, dated Apr. 26, 2020.
International Search Report and Written Opinion issued in corresponding application No. PCT/CN2019/080994, dated Oct. 15, 2020.
"Offline Session Notes for Joint MIMO&UL Control and CSI Reporting Session", 3GPP TSG RAN WG1 Meeting AH 1801, R1-1801167, Vancouver, Canada, Jan. 22-26, 2018.
"Remaining Issues on CSI Reporting", 3GPP TSG RAN WG1 Meeting #92, R1-1801519, Athens, Greece, Feb. 26-Mar. 2, 2018.
"Remaining Details for CSI Reporting on PUCCH", 3GPP TSG RAN WG1 Meeting #92, R1-1802285, Athens, Greece, Feb. 26-Mar. 2, 2018.

* cited by examiner

METHOD OF TRANSMITTING CSI REPORT, TERMINAL DEVICE AND NETWORK DEVICE

CROSS REFERENCE OF RELATED APPLICATION

The present application is a continuation application of PCT Application No. PCT/CN2019/080994 filed on Apr. 2, 2019, which claims a priority of Chinese patent application No. 201810302351.6 filed on Apr. 4, 2018, which is incorporated herein by reference in its entirety.

TECHNICAL FIELD

The present disclosure relates to the field of communications, and in particular, to a method of transmitting a CSI report, a terminal device and a network device.

BACKGROUND

A channel state information (Channel State Information, CSI) report may be configured as: a periodic CSI (Periodic CSI, P-CSI) report, a semi-persistent CSI (Semi-Persistent, CSI SP-CSI) report, or an aperiodic CSI (Aperiodic CSI, AP-CSI) report. The P-CSI is only transmitted on a PUCCH, the SP-CSI may be transmitted on a PUCCH or PUSCH, and the AP-CSI is only transmitted on a PUSCH.

A CSI report collision refers to: when two CSI reports allocated on the same component carrier (Component Carrier, CC) have at least one Orthogonal Frequency Division Multiplexing (OFDM) symbol overlapping in the time domain, then the two CSI reports overlaps with each other.

The related art still have defects in the processing mechanism of the CSI report collision group.

SUMMARY

The present disclosure provides a method of transmitting a CSI report and a terminal device, which provides a solution for solving a collision in a scenario of at least one CSI report collision group.

In a first aspect, a method of transmitting a channel state information (CSI) report is provided in an embodiment of the present disclosure, including:

determining, based on one or more collision groups that need to be transmitted on a physical uplink control channel (PUCCH) resource of a component carrier, a target PUCCH resource, where the target PUCCH resource is configured to transmit CSI reports in the one or more collision groups, the collision group includes at least two CSI reports, any one of the CSI reports in the collision group overlaps with at least one of the CSI reports in the collision group, and does not overlap with any CSI report outside the collision group;

in a case that a payload of a CSI report set to be put into the target PUCCH resource is larger than a transmission capacity of the target PUCCH resource meeting a target code rate, placing a part of the CSI reports of the CSI report set into the target PUCCH resource, according to priorities of the CSI reports;

in a case that the payload of the CSI report set is smaller than or equal to the transmission capacity of the target PUCCH resource meeting the target code rate, placing all the CSI reports of the CSI report set into the target PUCCH resource; and sending the placed CSI reports on the target PUCCH resource;

where the CSI report set at least includes the CSI reports in the one or more collision groups.

In a second aspect, a terminal device is provided in an embodiment of the present disclosure, including:

a determining module, configured to determine, based on one or more collision groups that need to be transmitted on a physical uplink control channel (PUCCH) resource of a component carrier, a target PUCCH resource, where the target PUCCH resource is configured to transmit CSI reports in the one or more collision groups, the collision group includes at least two CSI reports, any one of the CSI reports in the collision group overlaps with at least one of the CSI reports in the collision group, and does not overlap with any CSI report outside the collision group;

a placing module, configured to, in a case that a payload of a CSI report set to be put into the target PUCCH resource is larger than a transmission capacity of the target PUCCH resource meeting a target code rate, place a part of the CSI reports of the CSI report set into the target PUCCH resource, according to priorities of the CSI reports; in a case that the payload of the CSI report set is smaller than or equal to the transmission capacity of the target PUCCH resource meeting the target code rate, placing all the CSI reports of the CSI report set into the target PUCCH resource; and a sending module, configured to send the placed CSI reports on the target PUCCH resource;

where the CSI report set at least includes the CSI reports in the one or more collision groups.

In a third aspect, a terminal device is provided in an embodiment of the present disclosure, including a memory, a processor and a program stored in the memory and executable on the processor, and the processor executes the program to perform the method in the first aspect.

In a fourth aspect, a computer-readable storage medium is provided in an embodiment of the present disclosure, where a program is stored in the computer-readable storage medium, and a processor executes the program to perform the method in the first aspect.

In a fifth aspect, a method of transmitting a channel state information (CSI) report is provided in an embodiment of the present disclosure, including:

determining, based on one or more collision groups that need to be transmitted on a physical uplink control channel (PUCCH) resource of a component carrier, a target PUCCH resource, where the target PUCCH resource is configured to transmit CSI reports in the one or more collision groups, any one of the CSI reports in the collision group overlaps with at least one of other CSI reports in the collision group, and does not overlap with any CSI report outside the collision group;

in a case that each of priorities of the CSI reports in the one or more collision groups is lower than a priority of a target CSI report, discarding the CSI reports in the one or more collision groups, where the target CSI report does not overlap with the CSI reports in the one or more collision groups, and the target PUCCH resource overlaps with the target CSI report; and sending the target CSI report on the PUCCH resource corresponding to the target CSI report in the component carrier.

In a sixth aspect, a terminal device is provided in an embodiment of the present disclosure, including:

a determining module, configured to determine, based on one or more collision groups that need to be transmitted on a physical uplink control channel (PUCCH) resource of a component carrier, a target PUCCH resource, where the target PUCCH resource is configured to transmit CSI reports in the one or more collision groups, any one of the CSI reports in the collision group overlaps with at least one of other CSI reports in the collision group, and does not overlap with any CSI report outside the collision group;

a processing module, configured to, in a case that each of priorities of the CSI reports in the one or more collision groups is lower than a priority of a target CSI report, discard the CSI reports in the one or more collision groups, where the target CSI report does not overlap with the CSI reports in the one or more collision groups, and the target PUCCH resource overlaps with the target CSI report; and a sending module, configured to send the target CSI report on the PUCCH resource corresponding to the target CSI report in the component carrier.

In a seventh aspect, a terminal device is provided in an embodiment of the present disclosure, including a memory, a processor and a program stored in the memory and executable on the processor, and the processor executes the program to perform the method in the fifth aspect.

In an eighth aspect, a computer-readable storage medium is provided in an embodiment of the present disclosure, where a program is stored in the computer-readable storage medium, and a processor executes the program to perform the method in the fifth aspect.

In a ninth aspect, a method of transmitting a channel state information (CSI) report is provided in an embodiment of the present disclosure, including:

determining, based on one or more collision groups that need to be transmitted on a physical uplink control channel (PUCCH) resource of a component carrier, one or more target PUCCH resources, where the one or more target PUCCH resources are configured to transmit CSI reports in the one or more collision groups, the collision group includes at least two CSI reports, any one of the CSI reports overlaps with at least one of other CSI reports in the collision group, and does not overlap with any CSI report outside the collision group;

receiving the CSI reports on the determined one or more target PUCCH resources.

In a tenth aspect, a network device is provided in an embodiment of the present disclosure, including:

a determining module, configured to determine, based on one or more collision groups that need to be transmitted on a physical uplink control channel (PUCCH) resource of a component carrier, one or more target PUCCH resources, where the one or more target PUCCH resources are configured to transmit CSI reports in the one or more collision groups, the collision group includes at least two CSI reports, any one of the CSI reports overlaps with at least one of other CSI reports in the collision group, and does not overlap with any CSI report outside the collision group;

a receiving module, configured to receive the CSI reports on the determined one or more target PUCCH resources.

In an eleventh aspect, a network device is provided in an embodiment of the present disclosure, including a memory, a processor and a program stored in the memory and executable on the processor, and the processor executes the program to perform the method in the ninth aspect.

In a twelfth aspect, a computer-readable storage medium is provided in an embodiment of the present disclosure, where a program is stored in the computer-readable storage medium, and a processor executes the program to perform the method in the ninth aspect.

In a thirteenth aspect, a method of transmitting a channel state information (CSI) report is provided in an embodiment of the present disclosure, including:

determining, based on one or more collision groups that need to be transmitted on a physical uplink control channel (PUCCH) resource of a component carrier, a target PUCCH resource, where the target PUCCH resource is configured to transmit CSI reports in the one or more collision groups, any one of the CSI reports in the collision group overlaps with at least one of the CSI reports in the collision group, and does not overlap with any CSI report outside the collision group;

in a case that each of priorities of the CSI reports in the one or more collision groups is lower than a priority of a target CSI report, determining that the CSI reports in the one or more collision groups are discarded, where the target CSI report does not overlap with the CSI reports in the one or more collision groups, and the target PUCCH resource overlaps with the target CSI report; and receiving the target CSI report on the PUCCH resource corresponding to the target CSI report in the component carrier.

In a fourteenth aspect, a network device is provided in an embodiment of the present disclosure, including:

a first determining module, configured to determine, based on one or more collision groups that need to be transmitted on a physical uplink control channel (PUCCH) resource of a component carrier, a target PUCCH resource, where the target PUCCH resource is configured to transmit CSI reports in the one or more collision groups, any one of the CSI reports in the collision group overlaps with at least one of the CSI reports in the collision group, and does not overlap with any CSI report outside the collision group;

a second determining module, configured to, in a case that each of priorities of the CSI reports in the one or more collision groups is lower than a priority of a target CSI report, determine that the CSI reports in the one or more collision groups are discarded, where the target CSI report does not overlap with the CSI reports in the one or more collision groups, and the target PUCCH resource overlaps with the target CSI report; and a receiving module, configured to receive the target CSI report on the PUCCH resource corresponding to the target CSI report in the component carrier.

In a fifth aspect, a network device is provided in an embodiment of the present disclosure, including a memory, a processor and a program stored in the memory and executable on the processor, and the processor executes the program to perform the method in the thirteenth aspect.

In a sixteenth aspect, a computer-readable storage medium is provided in an embodiment of the present disclosure, where a program is stored in the computer-readable storage medium, and a processor executes the program to perform the method in the thirteenth aspect.

On one hand, according to the embodiments of the present disclosure, the target PUCCH resource is determined based on one or more collision groups that need to be transmitted on the PUCCH resources of the same component carrier, and at least a part of the CSI reports in the one or more collision groups are placed into and transmitted on the target PUCCH resource, thereby solving the PUCCH resource competition of the CSI reports on the same component carrier, and transmitting at least a part of the CSI reports.

On the other hand, according to the embodiments of the present disclosure, when the target PUCCH resource is determined based on one or more collision groups that need to be transmitted on the PUCCH resources of the same component carrier, and the target PUCCH resource overlaps with the target CSI report outside the collision group, and the priority of the CSI report of the collision group is lower than the priority of the target CSI report, the CSI report of the one or more collision groups is discarded and the target CSI report is sent, so as to transmit the CSI report with a higher priority in some scenarios.

BRIEF DESCRIPTION OF THE DRAWINGS

The drawings described here are used to provide a further understanding of the present disclosure and constitute a part of the present disclosure. The exemplary embodiments of the present disclosure and the description thereof are used to explain the present disclosure, and do not constitute an improper limitation of the present disclosure.

DETAILED DESCRIPTION

The technical solutions in the embodiments of the present disclosure will be described clearly with reference to the drawings in the embodiments of the present disclosure. Obviously, the described embodiments are part of the embodiments of the present disclosure, not all of the embodiments. Based on the embodiments of the present disclosure, all other embodiments obtained by a person of ordinary skill in the art are within the scope of the present disclosure.

The technical solutions of the present disclosure may be applied to various communication systems, such as: global system of mobile communication (Global System of Mobile communication, GSM), code division multiple access (Code Division Multiple Access, CDMA) system, and wideband code division multiple access (Wideband Code Division Multiple Access, WCDMA), Wideband Code Division Multiple Access, general packet radio service (General Packet Radio Service, GPRS), long term evolution (Long Term Evolution, LTE)/long term evolution advanced (Long Term Evolution Advanced, LTE-A), new air interface (New Radio, NR), etc.

User Equipment (UE), also called Mobile Terminal, mobile user equipment, terminal device, etc., may be connected to one or more cores via a radio access network (for example, RAN, Radio Access Network). The user equipment can be a mobile terminal, such as a mobile phone (or "cellular" phone) and a computer with a mobile terminal. For example, it can be a portable, pocket-sized, handheld, built-in computer or vehicle-mounted mobile device, which exchange language and/or data with the wireless access network.

CSI report collision: when two CSI reports allocated on the same component carrier (Component Carrier, CC) have at least one Orthogonal Frequency Division Multiplexing (OFDM) symbol overlapping in the time domain, then the two CSI reports overlaps with each other.

Collision group: a set of the CSI reports that overlaps with each other on the same CC, where any CSI report in the collision group overlaps with at least one of the other CSI reports in the collision group, and does not overlap with any CSI report outside the collision group.

The technical solutions provided by the embodiments of the present disclosure will be described in detail below with reference to the drawings.

Figure 1:
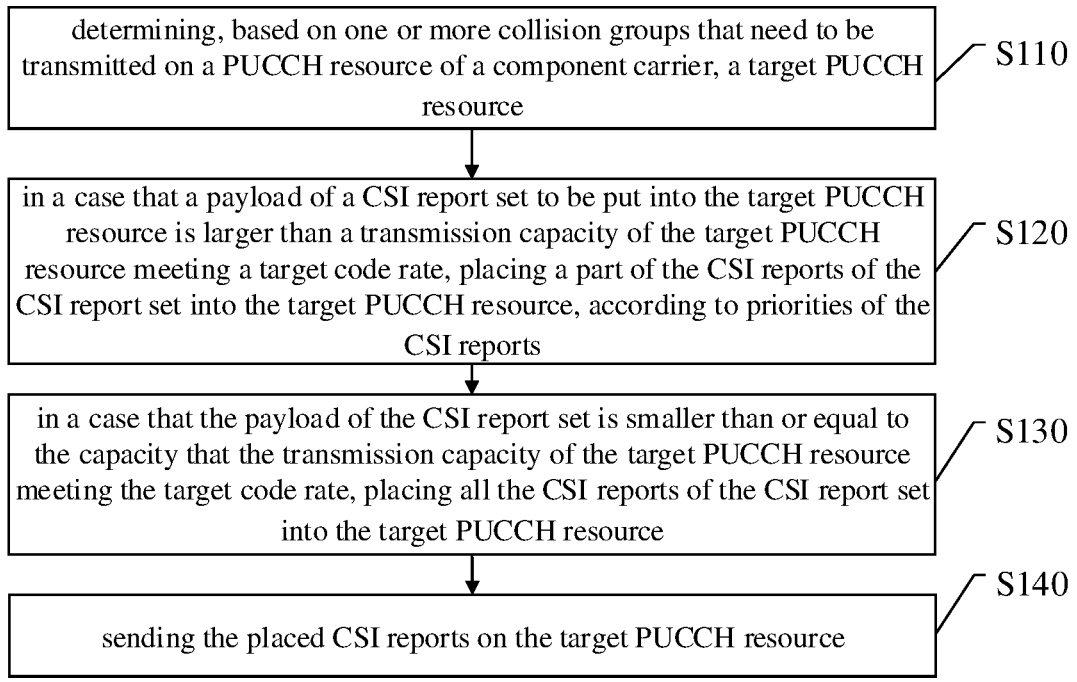
FIG. 1 is a flowchart of a method of transmitting a CSI report in an embodiment of the present disclosure.

FIG. 1 is a flowchart of a method of transmitting a CSI report in an embodiment of the present disclosure. The method in FIG. 1 may be applied to terminal device. The method includes: steps S110 to S140.

S110: determining, based on one or more collision groups that need to be transmitted on a PUCCH resource of a component carrier, a target PUCCH resource;

where the target PUCCH resource is configured to transmit CSI reports in the one or more collision groups, the collision group includes at least two CSI reports, any one of the CSI reports in the collision group overlaps with at least one of the CSI reports in the collision group, and does not overlap with any CSI report outside the collision group.

It should be understood that one CSI report is allocated to use one PUCCH resource of the component carrier. Both the PUCCH resource and the component carrier used for the CSI report may be allocated by network device (for example, base stations, etc.).

It should be understood that if a PUCCH resource used by a certain CSI report and a PUCCH resource used by any CSI report in the collision group do not overlap in symbols, the certain CSI report does not overlap with the collision group, that is, the certain CSI report does not belong to collision group.

It should be understood that the component carrier resource to be used by the CSI report and the PUCCH resource on the component carrier are all pre-allocated. For example, the component carrier resource to be used by the CSI report and the PUCCH resource on the component carrier are allocated by the network side device (e.g., base station, etc.) for the terminal device.

It should be understood that, in the embodiment of the present disclosure, the target PUCCH resource may be a multi-CSI PUCCH resource, and the overlapd CSI report may be placed on the multi-CSI PUCCH resource without overlap and may not overlap with the target PUCCH resource.

It should be understood that the determining the target PUCCH resource based on the CSI report may refer to the related art. Specifically, based on the CSI report payload of one or more collision groups, the multi-CSI PUCCH resource with the smallest capacity that can place all the CSI report payloads of one or more collision groups is selected; if the above requirements cannot be met, the multi-CSI PUCCH resource with the largest capacity is used as the target PUCCH resource.

Optionally, NR supports configuring J=2 PUCCH resources for transmitting multiple CSI reports—multi-CSI PUCCH—for the UE on each UL BWP. When two or more PUCCH-based CSI reports overlap with each other, the quantity of high-priority CSI reports that can be transmitted on the resource is determined based on the target coding rate of the configured multi-CSI PUCCH resource, and other low-priority CSI reports are discarded. When multiple PUCCH-based CSI reports overlap with each other, a multi-CSI PUCCH resource is selected according to the following rules:

The multi-CSI PUCCH resource with the smallest capacity that can place all the payloads of overlapd CSI reports is selected. If the above requirements cannot be met, the multi-CSI PUCCH resource with the largest capacity is selected and discarded according to the priority.

It should be understood that in the embodiments of the present disclosure, the target PUCCH resource and the candidate PUCCH resource refer to multi-CSI PUCCH resources.

The candidate PUCCH resources are J available multi-CSI PUCCH resources, and the target PUCCH resource is a multi-CSI PUCCH resource determined according to the rules in the related art. The target PUCCH resources and candidate PUCCH resources mentioned elsewhere in this disclosure are similar.

It should be understood that if the CSI report to be put into the target PUCCH resource is not limited to the CSI report in one or more collision groups, then the determining the target PUCCH resource based on one or more collision groups may include:

determining the target PUCCH resource based on the CSI report payload of one or more collision groups;

or, determining the target PUCCH resource based on one or more collision groups and the CSI report outside the collision group to be placed into the target PUCCH resource, that is, the target PUCCH resource is determined based on the CSI report payload of one or more collision groups and the CSI report payload outside the collision group to be placed into the target PUCCH resource.

S120: in a case that a payload of a CSI report set to be put into the target PUCCH resource is larger than a transmission capacity of the target PUCCH resource meeting a target code rate, placing a part of the CSI reports of the CSI report set into the target PUCCH resource, according to priorities of the CSI reports.

It should be understood that, in the embodiment of the present disclosure, the priority of the CSI report may follow the rule of discarding the overlapd CSI report according to priorities thereof in the related art. Specifically, each CSI report corresponds to a priority value. In a case the CSI report overlaps or the uplink transmission resource is limited, the UE does not send some CSI reports with high (or low) priority values. For example: firstly, the priorities of CSI are determined according to rule 1, if the priorities obtained according to rule 1 are equal, the priorities are determined according to rule 2, and so on.

Rule 1: determining the priority according to the time domain behavior/channel type, where the priority order is: AP-CSI>SP-CSI on PUSCH>SP-CSI on PUCCH>P-CSI;

Rule 2: determining the priority according to the CSI content, where the priority order is: Beam reports>CSI;

Rule 3: determining the priority according to the CellID, where the priority order is: primary cell (PCell) >PSCell>other cell IDs in the ascending order;

Rule 4: determining the priority according to CSI ReportID, where the priority order is: CSI ReportID in ascending order.

Rules 2 to 4 are only applicable to AP-CSI and SP-CSI reports transmitted based on PUCCH.

Of course, scenarios where other priority rules are used in the method of the embodiment of the present disclosure are not excluded, which is not limited in the embodiment of the present disclosure herein.

S130: in a case that the payload of the CSI report set is smaller than or equal to the transmission capacity of the target PUCCH resource meeting the target code rate, placing all the CSI reports of the CSI report set into the target PUCCH resource.

S140: sending the placed CSI reports on the target PUCCH resource;

where the CSI report set at least includes the CSI reports in the one or more collision groups.

According to the embodiment of the present disclosure, the target PUCCH resource is determined based on one or more collision groups that need to be transmitted on the PUCCH resources of the same component carrier, and at least a part of the CSI reports in the one or more collision groups are placed into and transmitted on the target PUCCH resource, thereby solving the PUCCH resource competition of the CSI reports on the same component carrier.

Figure 2:
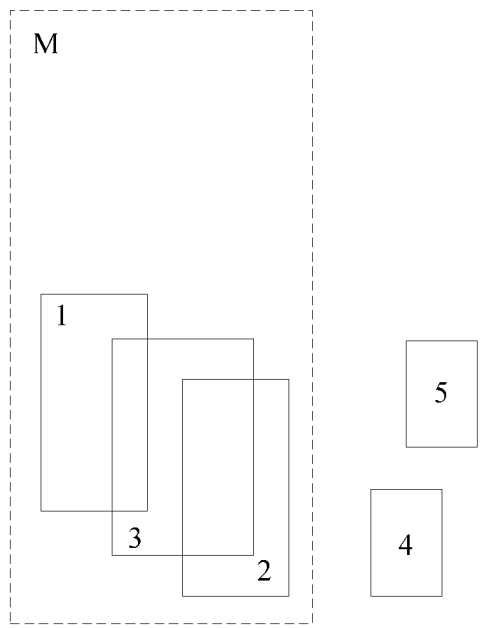
FIG. 2 is a schematic diagram of a scene of collision of CSI reports transmitted through PUCCH resources on the same CC in an embodiment of the present disclosure.

FIG. 2 is a schematic diagram of a scene of collision of CSI reports transmitted through PUCCH resources on the same CC in an embodiment of the present disclosure. As shown in FIG. 2, the dotted rectangular frame M represents multi-CSI PUCCH resources, one solid rectangular frame represents the PUCCH resources occupied by one CSI report, 1, 2, 3, 4, and 5 represent CSI reports 1, 2 based on PUCCH respectively, 3, 4, 5, and 1 indicate the highest priority, and so on. The horizontal axis is time and the vertical axis is frequency. In FIG. 2, CSI report 1, CSI report 2 and CSI report 3 overlap, CSI report 4 and CSI report 5 overlap, and {CSI report 1, CSI report 2, CSI report 3} do not overlap with {CSI report 4, CSI Report 5}. According to the definition of collision group, {CSI report 1, CSI report 2, CSI report 3} is a collision group, and {CSI report 4, CSI report 5} is another collision group.

Based on FIG. 2, the following table may be obtained:

TABLE 1

| time domain overlapping relation | collision relation |
| --- | --- |
| 1 and 3 overlaps, 2 and 3 overlaps; 4 and 5 overlaps | 1, 2, 3 overlaps (1, 2, 3 belong to the same collision group); 4, 5 overlaps (4, 5 belong to the same collision group) |

In the embodiment of the present disclosure, the collision group {CSI report 1, CSI report 2, CSI report 3} and the collision group {CSI report 4, CSI report 5} can be placed on the target PUCCH resource M.

Of course, it should be understood that in the process of placing the collision groups into the target PUCCH resource, if the payloads of the CSI reports of the one or more collision groups exceeds the quantity of bits supported by the target code rate of the target PUCCH resource, the CSI reports with low priorities may be discarded based on the priorities of the CSI reports in the one or more collision group.

Optionally, in some embodiments, when step S140 is performed, the method may further include:

sending a first CSI report on the PUCCH resource used by the first CSI report in the component carrier, where the first CSI report does not overlap with the one or more collision groups, and the first CSI report does not overlap with the target PUCCH resource.

Figure 3:
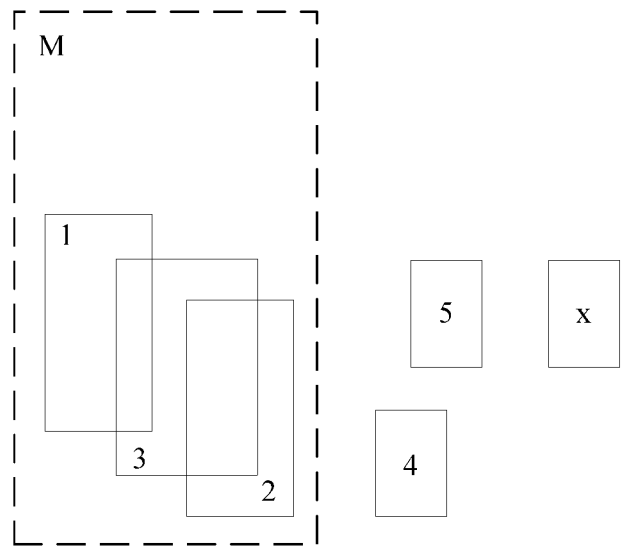
FIG. 3 is a schematic diagram of a scene of collision of CSI reports transmitted through PUCCH resources on the same CC in an embodiment of the present disclosure.

FIG. 3 is a schematic diagram of a scene of collision of CSI reports transmitted through PUCCH resources on the same CC in an embodiment of the present disclosure. In FIG. 3, CSI report 1, CSI report 2 and CSI report 3 overlap, CSI report 4 and CSI report 5 overlap, and {CSI report 1, CSI report 2, CSI report 3} do not overlap with {CSI report 4, CSI report 5}. In addition, the CSI report x does not overlap with other CSI reports, and does not overlap with the target PUCCH resource M.

At this time, the placement of collision groups {CSI report 1, CSI report 2, CSI report 3} and {CSI report 4, CSI report 5} may refer to the solution of the application scenario shown in FIG. 2 in the foregoing embodiment. In addition, for CSI report x can be sent on the PUCCH resource originally configured for CSI report x.

Optionally, in some embodiments, the CSI report set further includes a second CSI report, where the second CSI report is configured on one PUCCH resource of the component carrier, and the second CSI report does not overlap with the one or more collision groups, and the second CSI report does not overlap with the target PUCCH resource.

Still taking FIG. 3 as an example, in these embodiments, the CSI report X may also be placed in the target PUCCH resource M. In addition, if the sum of the payloads of CSI report 1-5 and CSI report x exceeds the quantity of bits supported by the target code rate of the target PUCCH resource, according to the priorities of CSI report 1-5 and CSI report x, the CSI report with a lower priority may be discarded.

Optionally, in some embodiments, the CSI report set further includes a second CSI report, where the second CSI report is configured on one PUCCH resource of the component carrier, and the second CSI report does not overlap with the one or more collision groups, and the second CSI report overlaps with the target PUCCH resource.

Figure 4:
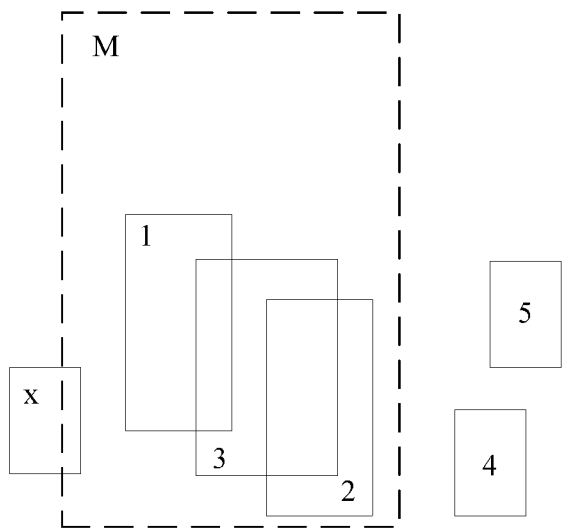
FIG. 4 is a schematic diagram of a scene of collision of CSI reports transmitted through PUCCH resources on the same CC in an embodiment of the present disclosure.

FIG. 4 is a schematic diagram of a scene of collision of CSI reports transmitted through PUCCH resources on the same CC in an embodiment of the present disclosure. In FIG. 4, CSI report 1, CSI report 2 and CSI report 3 overlap, CSI report 4 and CSI report 5 overlap, and {CSI report 1, CSI report 2, CSI report 3} do not overlap with {CSI report 4, CSI Report 5}. In addition, the CSI report x does not overlap with other CSI reports, but overlaps with the target PUCCH resource M.

In these embodiments, the CSI report x may also be placed in the target PUCCH resource M. In addition, if the sum of the payloads of CSI report 1-5 and CSI report x exceeds the quantity of bits supported by the target code rate of the target PUCCH resource, according to the priorities of CSI report 1-5 and CSI report x, the CSI report with a lower priority may be discarded.

Optionally, in some embodiments, if the second CSI report overlaps with the target PUCCH resource, before step S140, the method further includes:

discarding a third CSI report, where the third CSI report is configured on one PUCCH resource of the component carrier, and the third CSI report does not overlap with the one or more collision groups, and the third CSI report overlaps with the target PUCCH resource.

Still taking the scenario shown in FIG. 4 as an example, if the CSI report x overlaps with the target PUCCH resource M, one or more collision groups can be placed in the target PUCCH resource M, and the CSI report x can be discarded.

Further, in a case that the priority of at least one CSI report in the CSI report set is not lower than the priority of the third CSI report, the third CSI report is discarded.

Still taking the scenario shown in FIG. 4 as an example, the CSI report x overlaps with the target PUCCH resource M, then the priority of the CSI report 1-5 is compared with the priority of the CSI report x; if a priority of at least one of the CSI reports 1-5 is higher than that of the CSI report x, the CSI report x is discarded.

Optionally, in some embodiments where there are CSI reports outside of the collision group, step S110 may further include:

determining a candidate PUCCH resource based on the one or more collision groups;

in a case that a sum of payloads of the CSI reports in the one or more collision groups and a payload of the second CSI report is smaller than or equal to a transmission capacity of the candidate PUCCH resource meeting the target code rate, or in a case that the candidate PUCCH resource is a candidate PUCCH resource of a maximum capacity of the component carrier, determining the candidate PUCCH resource to be the target PUCCH resource;

in a case that the sum of the payloads of the CSI reports in the one or more collision groups and the payload of the second CSI report is larger than the transmission capacity of the candidate PUCCH resource meeting the target code rate and the candidate PUCCH resource is not a candidate PUCCH resource of the maximum capacity of the component carrier, determining the target PUCCH resource based on the one or more collision groups and the second CSI report.

According to the embodiments of the present disclosure, the PUCCH resource competition of the CSI reports on the same component carrier may be solved, and at least a part of the CSI reports may be transmitted.

Figure 5:
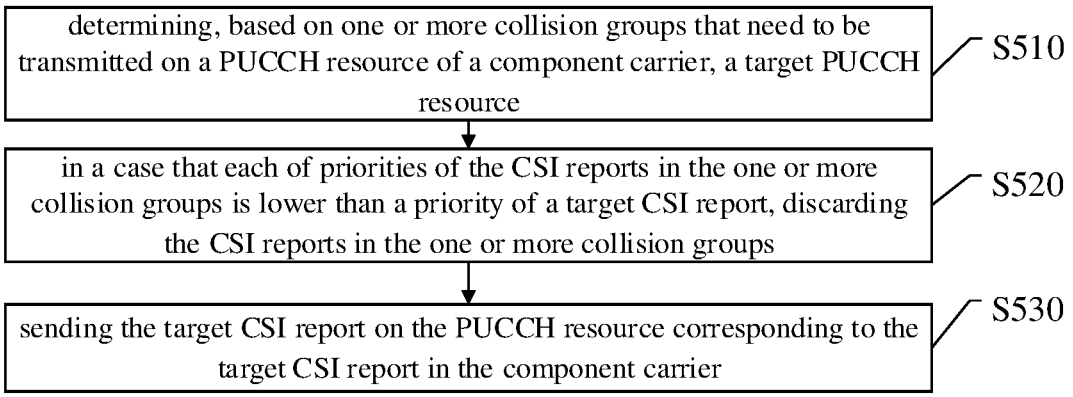
FIG. 5 is a flowchart of a method of transmitting a CSI report in an embodiment of the present disclosure.

FIG. 5 is a flowchart of a method of transmitting a CSI report in an embodiment of the present disclosure. The method is applied to a terminal device, and the method includes: steps S510 to S530.

S510: determining, based on one or more collision groups that need to be transmitted on a PUCCH resource of a component carrier, a target PUCCH resource;

where the target PUCCH resource is configured to transmit CSI reports in the one or more collision groups, any one of the CSI reports in the collision group overlaps with at least one of other CSI reports in the collision group, and does not overlap with any CSI report outside the collision group.

It should be understood that one CSI report is allocated to use one PUCCH resource of the component carrier. Both PUCCH resource and component carrier used for CSI report may be allocated by the network device (for example, base stations, etc.).

S520: in a case that each of priorities of the CSI reports in the one or more collision groups is lower than a priority of a target CSI report, discarding the CSI reports in the one or more collision groups.

where the target CSI report does not overlap with the CSI reports in the one or more collision groups, and the target PUCCH resource overlaps with the target CSI report.

S530: sending the target CSI report on the PUCCH resource corresponding to the target CSI report in the component carrier.

According to the embodiment of the present disclosure, when the PUCCH resource used to place the collision group overlaps with the target CSI report, and each of the priorities of the CSI reports in the collision group is lower than the priority of the target CSI report, the CSI reports in the collision group are discarded, so that it is able to transmit the high-priority CSI report in some scenarios.

Still taking the scenario shown in FIG. 4 as an example, if the CSI report x overlaps with the target PUCCH resource M, the priorities of the CSI report 1-5 are compared with the priority of the CSI report x; if the priorities of the CSI reports in the CSI report 1-5 are lower than that of the CSI report x, then the CSI reports 1-5 are discarded.

Figure 6:
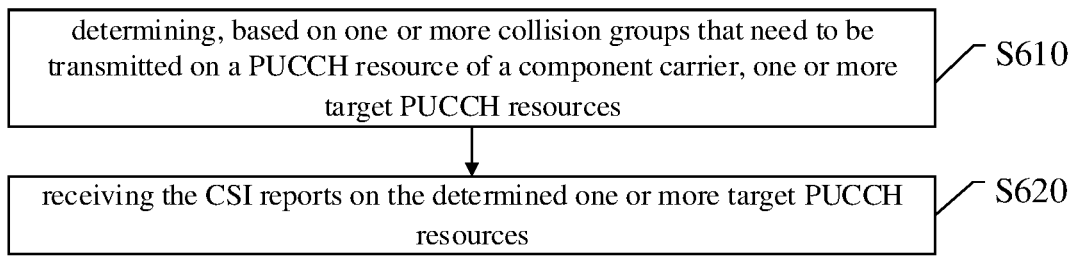
FIG. 6 is a flowchart of a method of transmitting a CSI report in an embodiment of the present disclosure.

FIG. 6 is a flowchart of a method of transmitting a CSI report in an embodiment of the present disclosure. The method in FIG. 1 may be applied to the network device. The method includes steps S610 and S620.

S610: determining, based on one or more collision groups that need to be transmitted on a PUCCH resource of a component carrier, one or more target PUCCH resources.

where the one or more target PUCCH resources are configured to transmit CSI reports in the one or more collision groups, the collision group includes at least two CSI reports, any one of the CSI reports overlaps with at least one of other CSI reports in the collision group, and does not overlap with any CSI report outside the collision group.

It should be understood that one CSI report is allocated to use one PUCCH resource of the component carrier. Both PUCCH resource and component carrier used for CSI report can be allocated by the network device (for example, base stations, etc.).

For the specific implementation of step S610, refer to step S110 in FIG. 1.

S620: receiving the CSI reports on the determined one or more target PUCCH resources.

According to the embodiment of the present disclosure, one or more target PUCCH resources are determined based on one or more collision groups that need to be transmitted on PUCCH resources of the same component carrier, and the CSI report is received on the determined one or more target PUCCH resources, thereby solving the PUCCH resource competition of the CSI reports on the same component carrier.

Optionally, in some embodiments, the method may further include: determining not to receive a second CSI report on the PUCCH resource allocated for the second CSI report, where the second CSI report does not overlap with the one or more collision groups, and the second CSI report does not overlap with the target PUCCH resource.

Optionally, in some embodiments, the method further includes: determining not to receive a second CSI report on the PUCCH resource allocated for the second CSI report, where the second CSI report does not overlap with the one or more collision groups, and the second CSI report overlaps with the target PUCCH resource.

Optionally, in some embodiments, the method further includes: determining that a third CSI report is discarded, where the third CSI report is configured on one PUCCH resource of the component carrier, and the third CSI report does not overlap with the one or more collision groups, and the third CSI report overlaps with the target PUCCH resource Optionally, in some embodiments, the method further includes: determining that a third CSI report is discarded, wherein the third CSI report is configured on a PUCCH resource of the component carrier, and the third CSI report and the one or Multiple collision groups do not overlap, and the third CSI report overlaps with the target PUCCH resource.

Further, the determining that the third CSI report is discarded includes: in a case that a priority of at least one CSI report in the one or more collision groups is not lower than a priority of the third CSI report, discarding the third CSI report.

Optionally, in some embodiments, step S610 may be implemented as:

determining a candidate PUCCH resource based on the one or more collision groups;

in a case that a sum of payloads of the CSI reports in the one or more collision groups and a payload of the second CSI report is smaller than or equal to a transmission capacity of the candidate PUCCH resource meeting the target code rate, or in a case that the candidate PUCCH resource is a candidate PUCCH resource of a maximum capacity of the component carrier, determining the candidate PUCCH resource to be the target PUCCH resource;

in a case that the sum of the payloads of the CSI reports in the one or more collision groups and the payload of the second CSI report is larger than the transmission capacity of the candidate PUCCH resource meeting the target code rate and the candidate PUCCH resource is not a candidate PUCCH resource of the maximum capacity of the component carrier, determining the target PUCCH resource based on the one or more collision groups and the second CSI report;

where the network device is able to determine the payloads of the CSI reports in the one or more collision groups and the payload of the second CSI report.

For the specific implementation of each method step in the embodiment shown in FIG. 6, reference may be made to the corresponding method executed by the terminal device in the embodiment shown in FIG. 1, which will not be repeated.

According to the embodiments of the present disclosure, the PUCCH resource competition for CSI reports on the same component carrier may be solved, and at least a part of CSI reports may be transmitted.

Figure 7:
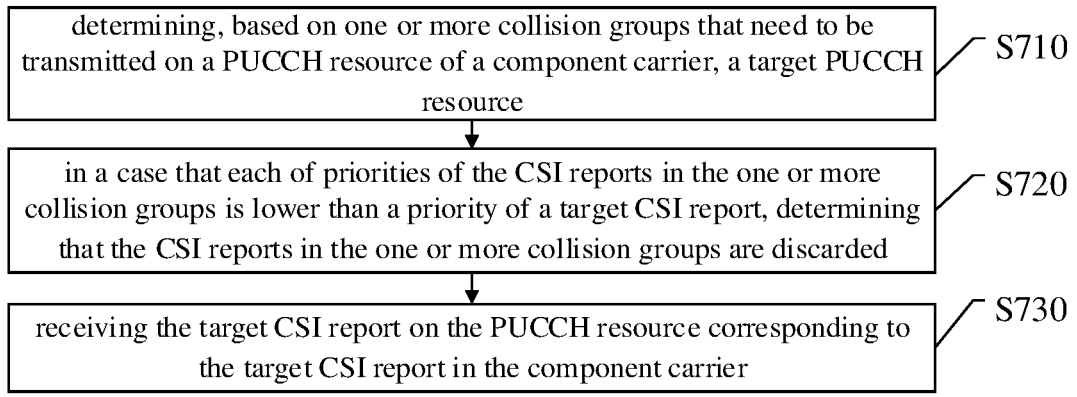
FIG. 7 is a flowchart of a method of transmitting a CSI report in an embodiment of the present disclosure.

FIG. 7 is a flowchart of a method of transmitting a CSI report in an embodiment of the present disclosure. The method is applied to a network device, and the method includes: steps S710 to S730.

S710: determining, based on one or more collision groups that need to be transmitted on a PUCCH resource of a component carrier, a target PUCCH resource, where the target PUCCH resource is configured to transmit CSI reports in the one or more collision groups, any one of the CSI reports in the collision group overlaps with at least one of the CSI reports in the collision group, and does not overlap with any CSI report outside the collision group.

It should be understood that one CSI report is allocated to use one PUCCH resource of the component carrier. Both the PUCCH resource and component carrier used for the CSI report may be allocated by the network device (for example, base stations, etc.).

S720: in a case that each of priorities of the CSI reports in the one or more collision groups is lower than a priority of a target CSI report, determining that the CSI reports in the one or more collision groups are discarded, where the target CSI report does not overlap with the CSI reports in the one or more collision groups, and the target PUCCH resource overlaps with the target CSI report.

S730: receiving the target CSI report on the PUCCH resource corresponding to the target CSI report in the component carrier.

According to the embodiments of the present disclosure, when the PUCCH resource used to place the collision group overlaps with the target CSI report, and each of the priorities of the CSI reports of the collision group is lower than the priority of the target CSI report, the CSI report of the collision group is discarded, so that it is able to transmit the high-priority CSI reports in some scenarios.

For the specific implementation of the embodiment shown in FIG. 7, reference may be made to the embodiment shown in FIG. 5, and details are not described again.

Figure 8:
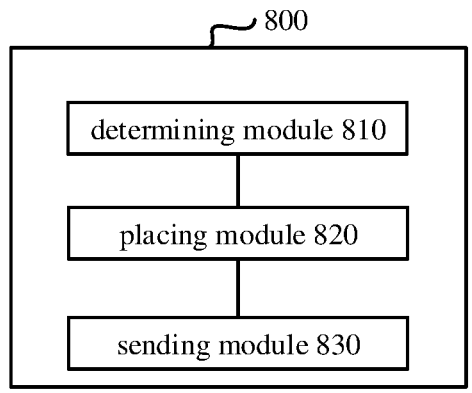
FIG. 8 is a schematic structural diagram of a terminal device in an embodiment of the present disclosure.

FIG. 8 is a schematic structural diagram of a terminal device in an embodiment of the present disclosure.

As shown in FIG. 8, the terminal device 800 may include:

a determining module 810, configured to determine, based on one or more collision groups that need to be transmitted on a physical uplink control channel (PUCCH) resource of a component carrier, a target PUCCH resource, where the target PUCCH resource is configured to transmit CSI reports in the one or more collision groups, the collision group includes at least two CSI reports, any one of the CSI reports in the collision group overlaps with at least one of the CSI reports in the collision group, and does not overlap with any CSI report outside the collision group;

a placing module 820, configured to, in a case that a payload of a CSI report set to be put into the target PUCCH resource is larger than a transmission capacity of the target PUCCH resource meeting a target code rate, place a part of the CSI reports of the CSI report set into the target PUCCH resource, according to priorities of the CSI reports; in a case that the payload of the CSI report set is smaller than or equal to the transmission capacity of the target PUCCH resource meeting the target code rate, placing all the CSI reports of the CSI report set into the target PUCCH resource; and a sending module 830, configured to send the placed CSI reports on the target PUCCH resource;

where the CSI report set at least includes the CSI reports in the one or more collision groups.

The terminal device 800 may also implement the method steps executed by the terminal device in the embodiment shown in FIG. 1, which will not be repeated here.

Figure 9:
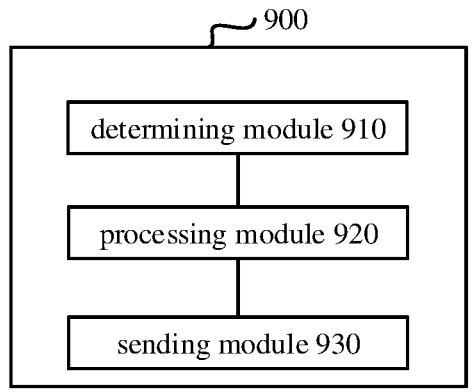
FIG. 9 is a schematic structural diagram of a terminal device in an embodiment of the present disclosure.

FIG. 9 is a schematic structural diagram of a terminal device in an embodiment of the present disclosure.

As shown in FIG. 9, the terminal device 900 may include:

a determining module 910, configured to determine, based on one or more collision groups that need to be transmitted on a physical uplink control channel (PUCCH) resource of a component carrier, a target PUCCH resource, where the target PUCCH resource is configured to transmit CSI reports in the one or more collision groups, any one of the CSI reports in the collision group overlaps with at least one of other CSI reports in the collision group, and does not overlap with any CSI report outside the collision group;

a processing module 920, configured to, in a case that each of priorities of the CSI reports in the one or more collision groups is lower than a priority of a target CSI report, discard the CSI reports in the one or more collision groups, where the target CSI report does not overlap with the CSI reports in the one or more collision groups, and the target PUCCH resource overlaps with the target CSI report; and a sending module 930, configured to send the target CSI report on the PUCCH resource corresponding to the target CSI report in the component carrier.

The terminal device 900 may also implement the method steps executed by the terminal device in the embodiment shown in FIG. 5, which will not be repeated here.

Figure 10:
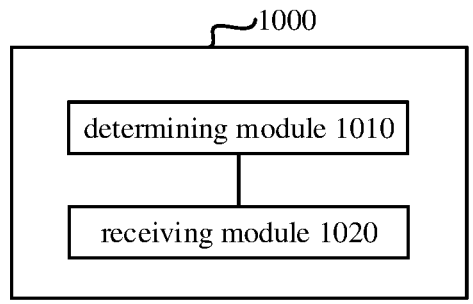
FIG. 10 is a schematic structural diagram of a network device in an embodiment of the present disclosure.

FIG. 10 is a schematic structural diagram of a network device in an embodiment of the present disclosure.

As shown in FIG. 10, the network device 1000 may include:

a determining module 1010, configured to determine, based on one or more collision groups that need to be transmitted on a physical uplink control channel (PUCCH) resource of a component carrier, one or more target PUCCH resources, where the one or more target PUCCH resources are configured to transmit CSI reports in the one or more collision groups, the collision group includes at least two CSI reports, any one of the CSI reports overlaps with at least one of other CSI reports in the collision group, and does not overlap with any CSI report outside the collision group;

a receiving module 1020, configured to receive the CSI reports on the determined one or more target PUCCH resources.

The network device 1000 may also implement the method steps executed by the network device in the embodiment shown in FIG. 6, which will not be repeated here.

Figure 11:
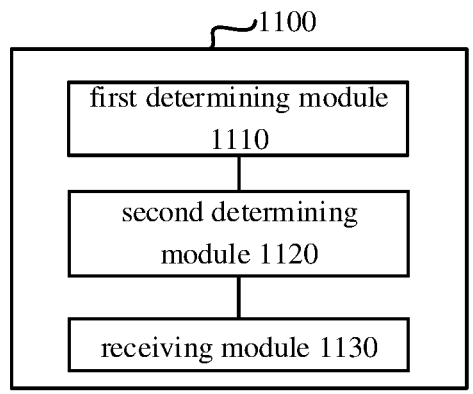
FIG. 11 is a schematic structural diagram of a network device in an embodiment of the present disclosure.

FIG. 11 is a schematic structural diagram of a network device in an embodiment of the present disclosure.

As shown in FIG. 11, the network device 1100 may include:

a first determining module 1110, configured to determine, based on one or more collision groups that need to be transmitted on a physical uplink control channel (PUCCH) resource of a component carrier, a target PUCCH resource, where the target PUCCH resource is configured to transmit CSI reports in the one or more collision groups, any one of the CSI reports in the collision group overlaps with at least one of the CSI reports in the collision group, and does not overlap with any CSI report outside the collision group;

a second determining module 1120, configured to, in a case that each of priorities of the CSI reports in the one or more collision groups is lower than a priority of a target CSI report, determine that the CSI reports in the one or more collision groups are discarded, where the target CSI report does not overlap with the CSI reports in the one or more collision groups, and the target PUCCH resource overlaps with the target CSI report; and a receiving module 1130, configured to receive the target CSI report on the PUCCH resource corresponding to the target CSI report in the component carrier.

The network device 1100 may also implement the method steps executed by the network device in the embodiment shown in FIG. 7, which will not be repeated here.

Figure 12:
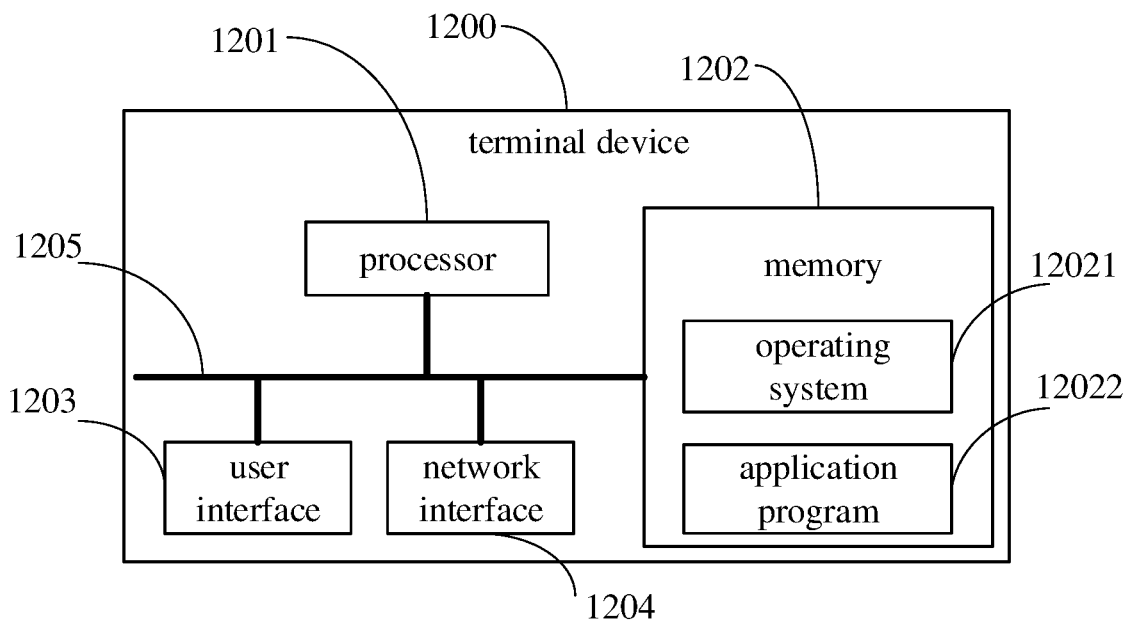
FIG. 12 is a block diagram of a terminal device in an embodiment of the present disclosure.

FIG. 12 is a block diagram of a terminal device in another embodiment of the present disclosure.

The terminal device 1200 shown in FIG. 12 includes: at least one processor 1201, a memory 1202, at least one network interface 1204, and a user interface 1203. The various components in the terminal device 1200 are coupled together through the bus system 1205. It can be understood that the bus system 1205 is used to implement connection and communication between these components. In addition to the data bus, the bus system 1205 also includes a power bus, a control bus, and a status signal bus. However, for clarity of description, various buses are marked as the bus system 1205 in FIG. 12.

The user interface 1203 may include a display, a keyboard, or a pointing device (for example, a mouse, a trackball (trackball), a touch panel, or a touch screen).

It can be understood that the memory 1202 in the embodiment of the present disclosure may be a volatile memory or a non-volatile memory, or may include both volatile and non-volatile memory. The non-volatile memory can be read-only memory (Read-Only Memory, ROM), programmable read-only memory (Programmable ROM, PROM), erasable programmable read-only memory (Erasable PROM, EPROM), and electrically available Erase programmable read-only memory (Electrically EPROM, EEPROM) or flash memory. The volatile memory may be random access memory (Random Access Memory, RAM), which is used as an external cache. By way of exemplary but not restrictive description, many forms of RAM are available, such as static random access memory (Static RAM, SRAM), dynamic random access memory (Dynamic RAM, DRAM), synchronous dynamic random access memory (Synchronous DRAM, SDRAM), Double Data Rate Synchronous Dynamic Random Access Memory (Double Data Rate SDRAM, DDRSDRAM), Enhanced Synchronous Dynamic Random Access Memory (Enhanced SDRAM, ESDRAM), Synchronous Link Dynamic Random Access Memory (Synch link DRAM, SLDRAM) And Direct Rambus RAM (DRRAM). The memory 1202 of the system and method described in the embodiments of the present disclosure is intended to include but not limited to these and any other suitable types of memory.

In some embodiments, the memory 1202 stores the following elements, executable modules or data structures, or a subset of them, or an extended set of them: the operating system 12021 and the application program 12022.

The operating system 12021 includes various system programs, such as a framework layer, a core library layer, a driver layer, etc., for implementing various basic services and processing hardware-based tasks. The application program 12022 includes various application programs, such as a media player (Media Player), a browser (Browser), etc., which are used to implement various application services. A program for implementing the method of the embodiments of the present disclosure may be included in the application program 12022.

In the embodiment of the present disclosure, the terminal device 1200 further includes: a program stored in the memory 1202 and executable on the processor 1201. The processor executes the program 1201 to:

determine, based on one or more collision groups that need to be transmitted on a physical uplink control channel (PUCCH) resource of a component carrier, a target PUCCH resource, where the target PUCCH resource is configured to transmit CSI reports in the one or more collision groups, the collision group includes at least two CSI reports, any one of the CSI reports in the collision group overlaps with at least one of the CSI reports in the collision group, and does not overlap with any CSI report outside the collision group;

in a case that a payload of a CSI report set to be put into the target PUCCH resource is larger than a transmission capacity of the target PUCCH resource meeting a target code rate, place a part of the CSI reports of the CSI report set into the target PUCCH resource, according to priorities of the CSI reports;

in a case that the payload of the CSI report set is smaller than or equal to the transmission capacity of the target PUCCH resource meeting the target code rate, placing all the CSI reports of the CSI report set into the target PUCCH resource; and send the placed CSI reports on the target PUCCH resource;

where the CSI report set at least includes the CSI reports in the one or more collision groups.

It should be understood that, in the embodiment of the present disclosure, the overlapd CSI reports are processed, so that after the processing, there is no CSI overlapd report in the current component carrier. In other words, after processing the overlapd CSI report, there is no overlapd CSI report in the current component carrier. If there are still overlapd CSI reports after the discarding process, the discarding process is continued based on the priority of the CSI report.

The methods disclosed in the foregoing embodiments of the present disclosure may be applied to the processor 1201 or implemented by the processor 1201. The processor 1201 may be an integrated circuit chip with signal processing capability. In the implementation process, the steps of the foregoing method can be completed by an integrated logic circuit of hardware in the processor 1201 or instructions in the form of software. The aforementioned processor 1201 may be a general-purpose processor, a digital signal processor (Digital Signal Processor, DSP), an application specific integrated circuit (ASIC), a field programmable gate array (Field Programmable Gate Array, FPGA) or other Programmable logic devices, discrete gate or transistor logic devices, discrete hardware components. The methods, steps, and logical block diagrams disclosed in the embodiments of the present disclosure can be implemented or executed. The general-purpose processor may be a microprocessor or the processor may also be any conventional processor or the like. The steps of the method disclosed in the embodiments of the present disclosure may be directly embodied as being executed and completed by a hardware decoding processor, or executed and completed by a combination of hardware and software modules in the decoding processor. The software module may be located in a computer-readable storage medium that is mature in the field, such as random access memory, flash memory, read-only memory, programmable read-only memory, or electrically erasable programmable memory, registers. The computer-readable storage medium is located in the memory 1202, and the processor 1201 reads information in the memory 1202, and completes the steps of the foregoing method in combination with its hardware. Specifically, the computer-readable storage medium stores a program, and when the processor executes the program 1201, each step of the method embodiment shown in FIG. 1 is implemented.

It can be understood that the embodiments described in the embodiments of the present disclosure may be implemented by hardware, software, firmware, middleware, microcode, or a combination thereof. For hardware implementation, the processing unit can be implemented in one or more application specific integrated circuits (ASICs), digital signal processors (Digital Signal Processing, DSP), digital signal processing devices (DSP Device, DSPD), programmable Logic Device (Programmable Logic Device, PLD), Field-Programmable Gate Array (Field-Programmable Gate Array, FPGA), general-purpose processors, controllers, microcontrollers, microprocessors, and others for performing the functions described in this disclosure Electronic unit or its combination.

For software implementation, the technology described in the embodiments of the present disclosure can be implemented by modules (for example, procedures, functions, etc.) that perform the functions described in the embodiments of the present disclosure. The software codes can be stored in the memory and executed by the processor. The memory can be implemented in the processor or external to the processor.

The terminal device 1200 can implement various processes implemented by the terminal device in the embodiment shown in FIG. 1. To avoid repetition, details are not described herein again.

A computer-readable storage medium is further provide in the embodiment of the present disclosure, and a program is stored in the computer-readable storage medium. A processor executes the program to perform the method embodiment in FIG. 1, and the same technical effect can be achieved. To avoid repetition, details thereof are omitted herein. The computer-readable storage medium, such as read-only memory (Read-Only Memory, ROM), random access memory (Random Access Memory, RAM), magnetic disk, or optical disk, etc.

Figure 13:
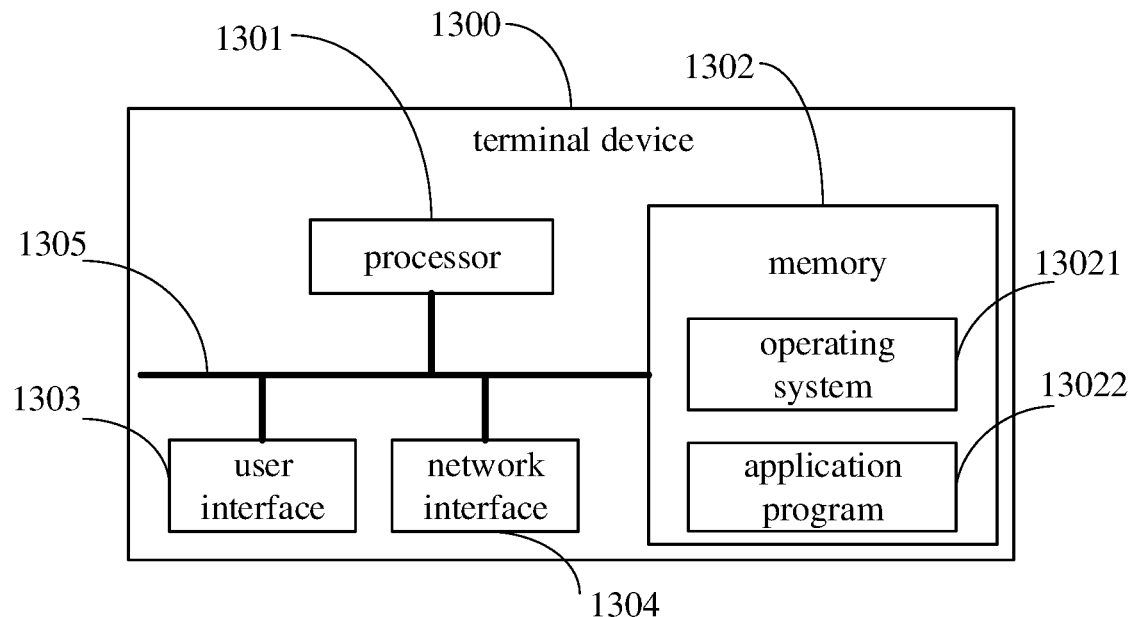
FIG. 13 is a block diagram of a terminal device in an embodiment of the present disclosure.

FIG. 13 is a block diagram of a terminal device in another embodiment of the present disclosure. The terminal device 1300 shown in FIG. 13 includes: at least one processor 1301, a memory 1302, at least one network interface 1304, and a user interface 1303. The various components in the terminal device 1300 are coupled together through the bus system 1305. It can be understood that the bus system 1305 is used to implement connection and communication between these components. In addition to the data bus, the bus system 1305 also includes a power bus, a control bus, and a status signal bus. However, for the sake of clarity, various buses are marked as the bus system 1305 in FIG. 13.

The user interface 1303 may include a display, a keyboard or a pointing device (for example, a mouse, a trackball (trackball), a touch panel or a touch screen, etc.).

It can be understood that the memory 1302 in the embodiment of the present disclosure may be a volatile memory or a non-volatile memory, or may include both volatile and non-volatile memory. The non-volatile memory may be a read-only memory (Read-Only Memory, ROM), a programmable read-only memory (Programmable ROM, PROM), an erasable programmable read-only memory (Erasable PROM, EPROM), and Erase programmable read-only memory (Electrically EPROM, EEPROM) or flash memory. The volatile memory may be random access memory (Random Access Memory, RAM), which is used as an external cache. By way of exemplary but not restrictive description, many forms of RAM are available, such as static random access memory (Static RAM, SRAM), dynamic random access memory (Dynamic RAM, DRAM), synchronous dynamic random access memory (Synchronous DRAM, SDRAM), Double Data Rate Synchronous Dynamic Random Access Memory (Double Data Rate SDRAM, DDRS-DRAM), Enhanced Synchronous Dynamic Random Access Memory (Enhanced SDRAM, ESDRAM), Synchronous Link Dynamic Random Access Memory (Synchlink DRAM, SLDRAM) And Direct Rambus RAM (DRRAM). The memory 1302 of the system and method described in the embodiments of the present disclosure is intended to include but not limited to these and any other suitable types of memory.

In some embodiments, the memory 1302 stores the following elements, executable modules or data structures, or a subset of them, or an extended set of them: operating system 13021 and application 13022.

The operating system 13021 includes various system programs, such as a framework layer, a core library layer, a driver layer, etc., for implementing various basic services and processing hardware-based tasks. The application program 13022 includes various application programs, such as a media player (Media Player), a browser (Browser), etc., which are used to implement various application services. The program for implementing the method of the embodiment of the present disclosure may be included in the application program 13022.

In the embodiment of the present disclosure, the terminal device 1300 further includes: a program that is stored in the memory 1302 and executable on the processor 1301. The processor executes the program 1301 to:

determine, based on one or more collision groups that need to be transmitted on a physical uplink control channel (PUCCH) resource of a component carrier, a target PUCCH resource, where the target PUCCH resource is configured to transmit CSI reports in the one or more collision groups, any one of the CSI reports in the collision group overlaps with at least one of other CSI reports in the collision group, and does not overlap with any CSI report outside the collision group;

in a case that each of priorities of the CSI reports in the one or more collision groups is lower than a priority of a target CSI report, discard the CSI reports in the one or more collision groups, where the target CSI report does not overlap with the CSI reports in the one or more collision groups, and the target PUCCH resource overlaps with the target CSI report; and send the target CSI report on the PUCCH resource corresponding to the target CSI report in the component carrier.

It should be understood that, in the embodiment of the present disclosure, the overlapd CSI reports are processed, so that after the processing, there is no CSI overlapd report in the current component carrier. In other words, after processing the overlapd CSI report, there is no overlapd CSI report in the current component carrier. If there are still overlapd CSI reports after the discarding process, the discarding process is continued based on the priority of the CSI report.

The methods disclosed in the above embodiments of the present disclosure may be applied to the processor 1301 or implemented by the processor 1301. The processor 1301 may be an integrated circuit chip with signal processing capabilities. In the implementation process, the steps of the foregoing method can be completed by an integrated logic circuit of hardware in the processor 1301 or instructions in the form of software. The aforementioned processor 1301 may be a general-purpose processor, a digital signal processor (DSP), an application specific integrated circuit (ASIC), a field programmable gate array (Field Programmable Gate Array, FPGA) or other Programmable logic devices, discrete gate or transistor logic devices, discrete hardware components. The methods, steps, and logical block diagrams disclosed in the embodiments of the present disclosure can be implemented or executed. The general-purpose processor may be a microprocessor or the processor may also be any conventional processor or the like. The steps of the method disclosed in the embodiments of the present disclosure may be directly embodied as being executed and completed by a hardware decoding processor, or executed and completed by a combination of hardware and software modules in the decoding processor. The software module can be located in a mature computer-readable storage medium in the field such as random access memory, flash memory, read-only memory, programmable read-only memory, or electrically erasable programmable memory, registers. The computer-readable storage medium is located in the memory 1302, and the processor 1301 reads information in the memory 1302, and completes the steps of the foregoing method in combination with its hardware. Specifically, the computer-readable storage medium stores a program, and when the processor executes the program 1301, each step of the method embodiment shown in FIG. 5 is implemented.

It can be understood that the embodiments described in the embodiments of the present disclosure may be implemented by hardware, software, firmware, middleware, microcode, or a combination thereof. For hardware implementation, the processing unit can be implemented in one or more application specific integrated circuits (ASICs), digital signal processors (Digital Signal Processing, DSP), digital signal processing devices (DSP Device, DSPD), programmable Logic Device (Programmable Logic Device, PLD), Field-Programmable Gate Array (Field-Programmable Gate Array, FPGA), general-purpose processors, controllers, microcontrollers, microprocessors, and others for performing the functions described in this disclosure Electronic unit or its combination.

For software implementation, the technology described in the embodiments of the present disclosure can be implemented by modules (for example, procedures, functions, etc.) that perform the functions described in the embodiments of the present disclosure. The software codes can be stored in the memory and executed by the processor. The memory can be implemented in the processor or external to the processor.

The terminal device 1300 can implement each process implemented by the terminal device in the embodiment shown in FIG. 5, and to avoid repetition, details are not described herein again.

A computer-readable storage medium is further provide in the embodiment of the present disclosure, and a program is stored in the computer-readable storage medium. A processor executes the program to perform the method embodiment in FIG. 5, and the same technical effect can be achieved. To avoid repetition, details thereof are omitted herein. The computer-readable storage medium, such as read-only memory (Read-Only Memory, ROM), random access memory (Random Access Memory, RAM), magnetic disk, or optical disk, etc.

Figure 14:
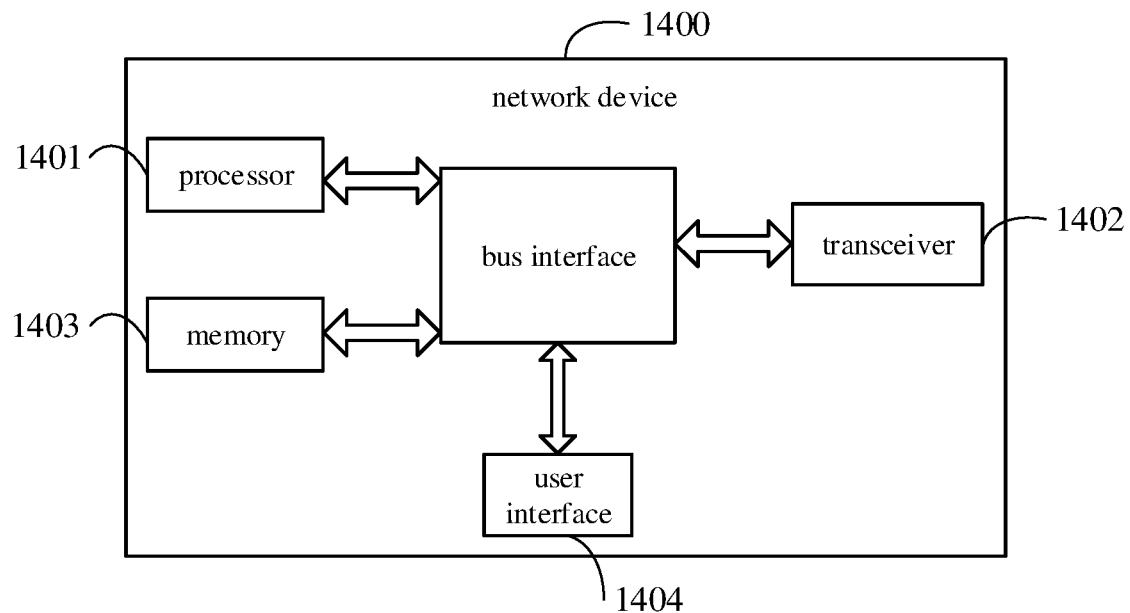
FIG. 14 is a block diagram of a network device in an embodiment of the present disclosure.

Referring to FIG. 14 which is a block diagram of a network device applied in an embodiment of the present disclosure, which can implement the details of the embodiment shown in FIG. 6 and achieve the same effect. As shown in FIG. 14, the network device 1400 includes: a processor 1401, a transceiver 1402, a memory 1403, a user interface 1404, and a bus interface.

In the embodiment of the present disclosure, the network device 1400 further includes: a program that is stored in the memory 1403 and can run on the processor 1401, and the processor 1401 executes the program to:

determine, based on one or more collision groups that need to be transmitted on a physical uplink control channel (PUCCH) resource of a component carrier, one or more target PUCCH resources, where the one or more target PUCCH resources are configured to transmit CSI reports in the one or more collision groups, the collision group includes at least two CSI reports, any one of the CSI reports overlaps with at least one of other CSI reports in the collision group, and does not overlap with any CSI report outside the collision group;

receive the CSI reports on the determined one or more target PUCCH resources.

It should be understood that one CSI report is allocated to use one PUCCH resource of the component carrier. Both the PUCCH resource and component carrier used for the CSI report can be allocated by the network device (for example, base stations, etc.).

In FIG. 14, the bus architecture may include any number of interconnected buses and bridges. Specifically, one or more processors represented by the processor 1401 and various circuits of the memory represented by the memory 1403 are linked together. The bus architecture can also link various other circuits such as peripheral devices, voltage regulators, power management circuits, etc., which are all known in the art, and therefore, no further descriptions are provided herein. The bus interface provides the interface. The transceiver 1402 may be a plurality of elements, that is, including a transmitter and a receiver, and provide a unit for communicating with various other devices on the transmission medium. For different user equipment, the user interface 1404 may also be an interface capable of connecting externally and internally with the required equipment. The connected equipment includes but not limited to a keypad, a display, a speaker, a microphone, a joystick, etc.

The processor 1401 is responsible for managing the bus architecture and general processing, and the memory 1403 can store data used by the processor 1401 when performing operations.

The network device 1400 can implement the various processes implemented by the network device in the embodiment shown in FIG. 6. In order to avoid repetition, details are not described herein again.

A computer-readable storage medium is further provided in an embodiment of the present disclosure, and the computer-readable storage medium stores a program. A processor executes the program to perform the method embodiment in FIG. 6, and the same technical effect can be achieved. To avoid repetition, details thereof are omitted herein. The computer-readable storage medium, such as read-only memory (Read-Only Memory, ROM), random access memory (Random Access Memory, RAM), magnetic disk, or optical disk, etc.

Figure 15:
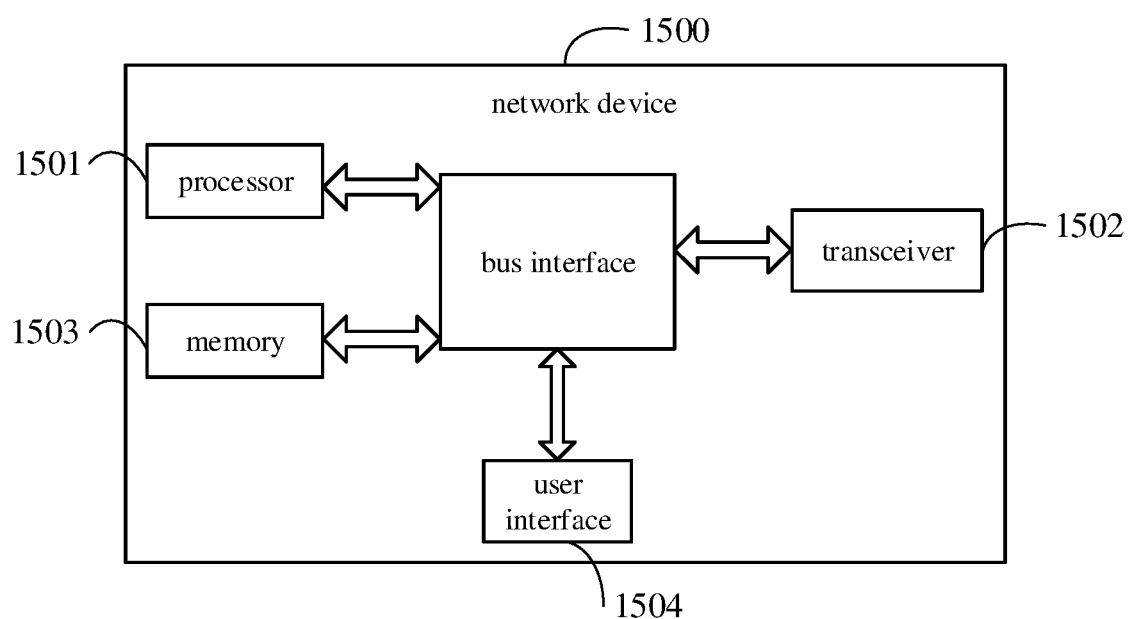
FIG. 15 is a block diagram of a network device in an embodiment of the present disclosure.

Referring to FIG. 15 which is a block diagram of a network device applied in an embodiment of the present disclosure, which can implement the details of the method of the embodiment shown in FIG. 7 and achieve the same effect. As shown in FIG. 15, the network device 1500 includes: a processor 1501, a transceiver 1502, a memory 1503, a user interface 1504, and a bus interface.

In the embodiment of the present disclosure, the network device 1500 further includes: a program that is stored in the memory 1503 and can run on the processor 1501, and the processor executes the program 1501 to:

determine, based on one or more collision groups that need to be transmitted on a physical uplink control channel (PUCCH) resource of a component carrier, a target PUCCH resource, where the target PUCCH resource is configured to transmit CSI reports in the one or more collision groups, any one of the CSI reports in the collision group overlaps with at least one of the CSI reports in the collision group, and does not overlap with any CSI report outside the collision group;

in a case that each of priorities of the CSI reports in the one or more collision groups is lower than a priority of a target CSI report, determine that the CSI reports in the one or more collision groups are discarded, where the target CSI report does not overlap with the CSI reports in the one or more collision groups, and the target PUCCH resource overlaps with the target CSI report; and receive the target CSI report on the PUCCH resource corresponding to the target CSI report in the component carrier.

It should be understood that one CSI report is allocated to use one PUCCH resource of the component carrier. Both the PUCCH resource and component carrier used for CSI report can be allocated by the network device (for example, base stations, etc.).

In FIG. 15, the bus architecture may include any number of interconnected buses and bridges. Specifically, one or more processors represented by the processor 1501 and various circuits of the memory represented by the memory 1503 are linked together. The bus architecture can also link various other circuits such as peripheral devices, voltage regulators, power management circuits, etc., which are all known in the art, and therefore, no further descriptions are provided herein. The bus interface provides the interface. The transceiver 1502 may be a plurality of elements, that is, including a transmitter and a receiver, and provide a unit for communicating with various other devices on the transmission medium. For different user equipment, the user interface 1504 may also be an interface capable of connecting externally and internally with the required equipment, and the connected equipment includes but not limited to a keypad, a display, a speaker, a microphone, a joystick, etc.

The processor 1501 is responsible for managing the bus architecture and general processing, and the memory 1503 can store data used by the processor 1501 when performing operations.

The network device 1500 can implement the various processes implemented by the network device in the embodiment shown in FIG. 7. In order to avoid repetition, details are not described herein again.

A computer-readable storage medium is further provide in the embodiment of the present disclosure, and a program is stored in the computer-readable storage medium. A processor executes the program to perform the method embodiment in FIG. 7, and the same technical effect can be achieved. To avoid repetition, details thereof are omitted herein. The computer-readable storage medium, such as read-only memory (Read-Only Memory, ROM), random access memory (Random Access Memory, RAM), magnetic disk, or optical disk, etc.

In some embodiments of the present disclosure, it is provided how to indicate the slot offset Y in sending the A-CSI report when the downlink control information (Downlink Control Information, DCI) only includes aperiodic channel state information (Aperiodic Channel State Information, A-CSI) request.

Method one:

sending a DCI format 0_1 message, where the DCI format 0_1 message includes a new field or a change of meaning of an original invalid field in the DCI format 0_1 message, the new added field or a field with a changed meaning is used to indicate the slot offset Y in sending the A-CSI report.

Specifically, a new field may be added to the existing DCI format 0_1, and the value of the newly added field is used to indicate the slot offset Y in sending the A-CSI report, or when only the DCI sent by the A-CSI report is included, the original invalid field in the DCI format 0_1 message is changed to a valid field. By adding a new field or changing the meaning of an invalid field to a valid field, it is possible to flexibly configure the slot offset of the PUSCH used by the A-CSI report, as well as information such as mapping type, starting symbol and length indication (SLIV).

For example, the value of the newly added field corresponds to the sequence number in the Report Slot Offset List (Report Slot Offset List) configured by the Radio Resource Control (Radio Resource Control, RRC) shown in Table 1. For example, if the value of the newly added field is 2, it can be determined that the slot offset Y for sending the A-CSI report is $Y_2$. The value of $Y_n$ in Table 1 is an integer from 0 to 7, and n is 1, 2, . . . 16.

TABLE 1

| index | slot offset |
|---|---|
| 1 | $Y_1$ |
| 2 | $Y_2$ |
| 3 | $Y_3$ |
| 4 | $Y_4$ |
| . . . | . . . |
| 16 | $Y_{16}$ |

Or, the value of the newly added field corresponds to the index in the pusch-Allocation List configured by RRC shown in Table 2. The value of $K_n$ in Table 2 is an integer from 0 to 7, and n is 1, 2, . . . 16. For example, if the value of the newly added field is 6, it can be determined that the slot offset Y in sending the A-CSI report is K6.

In addition, information such as PUSCH mapping type (Mapping Type), start symbol and length indication (SLIV) may be further obtained, and then the time domain configuration for transmitting A-CSI report as shown in Table 3 may be obtained.

TABLE 2

| index | slot offset | mapping type | start symbol S and length L in the slot |
|---|---|---|---|
| 1 | $K_1$ | A | $[S_1\ L_1]$ |
| 2 | $K_2$ | B | $[S_2\ L_2]$ |
| 3 | $K_3$ | B | $[S_3\ L_3]$ |
| 4 | $K_4$ | A | $[S_4\ L_4]$ |
| . . . | . . . | | |
| 16 | $K_{16}$ | A | $[S_{16}\ L_{16}]$ |

TABLE 3

| slot offset | start symbol S and length L in the slot |
|---|---|
| $Y_6$ | $[S_6\ L_6]$ |

Method Two:

sending the DCI format 0_1 message, where the time domain resource configuration field in the DCI format 0_1 message is also used to indicate the slot offset Y in sending the A-CSI report.

Specifically, by multiplexing the Time Domain Resource Assignment field in DCI format 0_1, the value of the Time Domain Resource Assignment field indicates the slot offset Y in sending the A-CSI report. The method of multiplexing the Time Domain Resource Assignment field can configure the slot offset of the PUSCH used by the A-CSI report, as well as information such as mapping type, start symbol, and length indication (SLIV) without increasing signaling overhead.

For example, the value of the Time Domain Resource Assignment field corresponds to the sequence number in Table 1, or the value of the Time Domain Resource Assignment field corresponds to the sequence number in Table 2. For example, if the value of the Time domain resource assignment field is 9, then the time domain configuration for transmitting the A-CSI report shown in Table 4 can be obtained according to Table 2.

TABLE 4

| slot offset | start symbol S and length L in the slot |
|---|---|
| $Y_9$ | $[S_9 \; L_9]$ |

In some other embodiments of the present disclosure, a method for determining the quantity of a channel quality indicator (Channel Quality Indicator, CQI) is also provided. Specifically, the number of CQIs is determined according to the value of the RRC parameter nrofCQIsPerReport.

For example, if the RRC parameter nrofCQIsPerReport=1, no matter what value (1-8) the RI of the CSI report takes, the number of CQIs is determined to be 1. When calculating and reporting the CQI, it is able to map the Signal to Interference plus Noise Ratio (SINR) of all layers into a codeword to calculate and report the one CQI (wideband CQI or sub-band CQI), or the SINRs of layer 1 to min{RI, 4} may be mapped to a codeword to calculate and report the one CQI (wideband CQI or sub-band CQI), and SINRs of the other layers are not reported.

Alternatively, for another example, if the RRC parameter nrofCQIsPerReport=1 and the RI limit of the CSI report of the terminal device is 4 at most, the number of CQIs is determined to be 1. When calculating and reporting the CQI, the layers 1 to RI are mapped to codeword according to the rules in the related art to calculate and report the one CQI.

Alternatively, for another example, if the RRC parameter nrofCQIsPerReport=2, then the layer-to-codeword mapping mode is determined according to the RI of the CSI report of the terminal device according to the rule in the related art, and the report CQI is calculated.

It should be noted that in this article, the terms "include", "include" or any other variants thereof are intended to cover non-exclusive inclusion, so that a process, method, article or device including a series of elements not only includes those elements, It also includes other elements not explicitly listed, or elements inherent to the process, method, article, or device. Without more restrictions, the element defined by the sentence "including a . . . " does not exclude the existence of other identical elements in the process, method, article or device that includes the element.

Through the description of the above embodiments, those skilled in the art can clearly understand that the method of the above embodiments can be implemented by means of software plus the necessary general hardware platform. Of course, it can also be implemented by hardware, but in many cases the former is better. Based on this understanding, the technical solution of the present disclosure essentially or the part that contributes to the related art can be embodied in the form of a software product, and the computer software product is stored in a storage medium (such as ROM/RAM, magnetic disk, optical disc) includes several instructions to make a terminal (which can be a mobile phone, a computer, a server, or a network device, etc.) execute the methods described in the various embodiments of the present disclosure.

The embodiments of the present disclosure are described above with reference to the drawings, but the present disclosure is not limited to the above-mentioned embodiments. The above-mentioned embodiments are only illustrative and not restrictive. Those skilled in the art, under the enlightenment of the present disclosure, without departing from the purpose of the present disclosure and the scope of the claims, may make many forms which all fall into the scope of the present disclosure.

What is claimed is:

1. A method of transmitting a channel state information (CSI) report, applied to a terminal device, comprising:
    determining, based on one or more collision groups that need to be transmitted on a physical uplink control channel (PUCCH) resource of a component carrier, a target PUCCH resource, wherein the target PUCCH resource is configured to transmit CSI reports in the one or more collision groups, the collision group comprises at least two CSI reports, any one of the CSI reports in the collision group overlaps with at least one of the CSI reports in the collision group, and does not overlap with any CSI report outside the collision group;
    in a case that a payload of a CSI report set to be put into the target PUCCH resource is larger than a transmission capacity of the target PUCCH resource meeting a target code rate, placing a part of the CSI reports of the CSI report set into the target PUCCH resource, according to priorities of the CSI reports;
    in a case that the payload of the CSI report set is smaller than or equal to the transmission capacity of the target PUCCH resource meeting the target code rate, placing all the CSI reports of the CSI report set into the target PUCCH resource; and
    sending the placed CSI reports on the target PUCCH resource;
    wherein the CSI report set at least comprises the CSI reports in the one or more collision groups.

2. The method according to claim 1, wherein in a case that the placed CSI reports are sent on the target PUCCH resource, the method further comprises:
    sending a first CSI report on the PUCCH resource used by the first CSI report in the component carrier, wherein the first CSI report does not overlap with the one or more collision groups, and the first CSI report does not overlap with the target PUCCH resource.

3. The method according to claim 1, wherein the CSI report set further comprises a second CSI report, wherein the second CSI report is configured on one PUCCH resource of the component carrier, and the second CSI report does not overlap with the one or more collision groups, and the second CSI report does not overlap with the target PUCCH resource.

4. The method according to claim 1, wherein the CSI report set further comprises a second CSI report, wherein the second CSI report is configured on one PUCCH resource of the component carrier, and the second CSI report does not overlap with the one or more collision groups, and the second CSI report overlaps with the target PUCCH resource.

5. The method according to claim 1, wherein prior to the sending the placed CSI report on the target PUCCH resource, the method further comprises:
    discarding a third CSI report, wherein the third CSI report is configured on one PUCCH resource of the component carrier, and the third CSI report does not overlap with the one or more collision groups, and the third CSI report overlaps with the target PUCCH resource.

6. The method according to claim 5, wherein the discarding the third CSI report comprises:
    in a case that the priority of at least one CSI report in the CSI report set is not lower than the priority of the third CSI report, discarding the third CSI report.

7. The method according to claim 3, wherein determining based the on one or more collision groups that need to be transmitted on the PUCCH resource of the component carrier the target PUCCH resource comprises:

determining a candidate PUCCH resource based on the one or more collision groups;
in a case that a sum of payloads of the CSI reports in the one or more collision groups and a payload of the second CSI report is smaller than or equal to a transmission capacity of the candidate PUCCH resource meeting the target code rate, or in a case that the candidate PUCCH resource is a candidate PUCCH resource of a maximum capacity of the component carrier, determining the candidate PUCCH resource to be the target PUCCH resource;
in a case that the sum of the payloads of the CSI reports in the one or more collision groups and the payload of the second CSI report is larger than the transmission capacity of the candidate PUCCH resource meeting the target code rate and the candidate PUCCH resource is not a candidate PUCCH resource of the maximum capacity of the component carrier, determining the target PUCCH resource based on the one or more collision groups and the second CSI report.

8. A terminal device, comprising a memory, a processor and a program stored in the memory and executable on the processor, and the processor executes the program to:
determine, based on one or more collision groups that need to be transmitted on a physical uplink control channel (PUCCH) resource of a component carrier, a target PUCCH resource, wherein the target PUCCH resource is configured to transmit CSI reports in the one or more collision groups, the collision group comprises at least two CSI reports, any one of the CSI reports in the collision group overlaps with at least one of the CSI reports in the collision group, and does not overlap with any CSI report outside the collision group;
in a case that a payload of a CSI report set to be put into the target PUCCH resource is larger than a transmission capacity of the target PUCCH resource meeting a target code rate, place a part of the CSI reports of the CSI report set into the target PUCCH resource, according to priorities of the CSI reports;
in a case that the payload of the CSI report set is smaller than or equal to the transmission capacity of the target PUCCH resource meeting the target code rate, place all the CSI reports of the CSI report set into the target PUCCH resource; and
send the placed CSI reports on the target PUCCH resource;
wherein the CSI report set at least comprises the CSI reports in the one or more collision groups.

9. The terminal device according to claim 8, wherein in a case that the placed CSI reports are sent on the target PUCCH resource, the processor executes the program to:
send a first CSI report on the PUCCH resource used by the first CSI report in the component carrier, wherein the first CSI report does not overlap with the one or more collision groups, and the first CSI report does not overlap with the target PUCCH resource.

10. The terminal device according to claim 8, wherein the CSI report set further comprises a second CSI report, wherein the second CSI report is configured on one PUCCH resource of the component carrier, and the second CSI report does not overlap with the one or more collision groups, and the second CSI report does not overlap with the target PUCCH resource.

11. The terminal device according to claim 8, wherein the CSI report set further comprises a second CSI report, wherein the second CSI report is configured on one PUCCH resource of the component carrier, and the second CSI report does not overlap with the one or more collision groups, and the second CSI report overlaps with the target PUCCH resource.

12. The terminal device according to claim 10, wherein the processor executes the program to:
determine a candidate PUCCH resource based on the one or more collision groups;
in a case that a sum of payloads of the CSI reports in the one or more collision groups and a payload of the second CSI report is smaller than or equal to a transmission capacity of the candidate PUCCH resource meeting the target code rate, or in a case that the candidate PUCCH resource is a candidate PUCCH resource of a maximum capacity of the component carrier, determine the candidate PUCCH resource to be the target PUCCH resource;
in a case that the sum of the payloads of the CSI reports in the one or more collision groups and the payload of the second CSI report is larger than the transmission capacity of the candidate PUCCH resource meeting the target code rate and the candidate PUCCH resource is not a candidate PUCCH resource of the maximum capacity of the component carrier, determine the target PUCCH resource based on the one or more collision groups and the second CSI report.

13. A method of transmitting a channel state information (CSI) report, applied to a terminal device, comprising:
obtaining a target PUCCH resource;
if any of a plurality of PUCCH resources overlap, the UE multiplexing all CSI reports carried in the PUCCH resources in the target PUCCH resource.

14. The method according to claim 13, wherein the UE multiplexing all CSI reports carried in the PUCCH resources in the target PUCCH resource comprises:
in a case that a total payload of all CSI reports carried in the PUCCH resources is smaller than or equal to a transmission capacity of the target PUCCH resource meeting a target code rate, placing all CSI reports carried in the PUCCH resources into the target PUCCH resource.

15. The method according to claim 13, wherein the UE multiplexing all CSI reports carried in the PUCCH resources in the target PUCCH resource comprises:
in a case that a total payload of all CSI reports carried in the PUCCH resources is larger than a transmission capacity of the target PUCCH resource meeting a target code rate, placing a part of the CSI reports carried in the PUCCH resources into the target PUCCH resource, according to priorities of the CSI reports.

16. The method according to claim 13, wherein the obtaining the target PUCCH resource comprises:
obtaining at least one candidate PUCCH resource;
determining one of the at least one candidate PUCCH resource, of which a transmission capacity meeting a target code rate is larger than or equal to a total payload of all CSI reports carried in the PUCCH resources, as the target PUCCH resource;
or
determining the candidate PUCCH resource with a maximum capacity in the at least one candidate PUCCH resource as the target PUCCH resource.

* * * * *